(12) United States Patent
Li

(10) Patent No.: US 8,289,577 B2
(45) Date of Patent: Oct. 16, 2012

(54) METHOD FOR HALFTONE IMAGE TRANSFORMATION, PRINTING AND HALFTONE MASK GENERATION

(75) Inventor: Te-Yuan Li, Hualien County (TW)

(73) Assignee: Qisda Corporation, Taoyuan County (TW)

( * ) Notice: Subject to any disclaimer, the term of this patent is extended or adjusted under 35 U.S.C. 154(b) by 724 days.

(21) Appl. No.: 12/433,274

(22) Filed: Apr. 30, 2009

(65) Prior Publication Data

US 2009/0273812 A1 Nov. 5, 2009

(30) Foreign Application Priority Data

May 1, 2008 (TW) ................ 97116053 A

(51) Int. Cl.
*G06K 15/00* (2006.01)
*G02F 1/136* (2006.01)

(52) U.S. Cl. ........................................ 358/3.06; 349/43

(58) Field of Classification Search .................. 358/3.06
See application file for complete search history.

(56) References Cited

U.S. PATENT DOCUMENTS

2005/0008235 A1* 1/2005 Sibade et al. ................. 382/233
* cited by examiner

*Primary Examiner* — Saeid Ebrahimi Dehkordy

(57) ABSTRACT

A printing method for printing an input image. Firstly, a halftone mask is generated. The input image is transformed into a halftone image through the halftone mask. The halftone image is then output for printing. The halftone mask is an array of N elements, and the following steps generate the halftone mask. An initial array of N elements is first provided. Thereafter, a first value is selectively assigned to an element in the initial array to generate a first array. The second to the $N^{th}$ arrays are then recursively generated based on the first array in the following steps. A minimum energy element in an $I^{th}$ array is first determined. An $(I+1)^{th}$ value is then assigned to the minimum energy element to generate an $(I+1)^{th}$ array, wherein I denotes 2 to N−1.

17 Claims, 10 Drawing Sheets

METHOD FOR HALFTONE IMAGE TRANSFORMATION, PRINTING AND HALFTONE MASK GENERATION

CROSS REFERENCE TO RELATED APPLICATIONS

This Application claims priority of Taiwan Patent Application No. 97116053, filed on May 1, 2008, the entirety of which is incorporated by reference herein.

BACKGROUND OF THE INVENTION

1. Field of the Invention

The invention relates to halftone image transformation, and in particular, to a method for generating a halftone mask using a Discrete Wavelet Transform (DWT) algorithm.

2. Description of the Related Art

Halftone transformation can induce an illusion effect on an image to extend the equivalent gray level variation, so that the image may look more realistic. Such a technique is widely adapted in the image processing fields, including the printing and display fields. An original image usually has gray levels higher than a printer can present, thus halftone transformation is required to reproduce an equivalent gray level effect on the printout. For example, a printer may be equipped with only black ink, and through halftone transformation, equivalent gray level effects can be rendered. Generally, an original pixel is converted into a plurality of tiny dots distributed in a particular manner. Specifically, the gray level can be simulated by dot size variation, or by dot density variation. Different dot densities can exhibit different gray level effects, and distribution of the dots are performed by a predetermined halftone mask such as Blue Noise Mask, Void & Cluster, or a real time schematic such as Error Diffusion.

FIG. 1 shows conventional printing equipment 100, comprising essential components such as at least a processor 110, a read only memory (ROM) 120 and a mechanical module 130. The ROM 120 stores a previously designed halftone mask #MASK. When an original image #IMG is sent to the printing equipment 100, the processor 110 uses the halftone mask #MASK to convert the original image #IMG into a halftone image #HALF, and thereafter, the mechanical module 130 performs physical operations to render a printout #PRINT from the halftone image #HALF. Practically, the halftone mask can be widely adapted to various applications, in addition to the printing equipment 100. However, detailed introduction is omitted herein. According to the aforementioned example, the equivalent gray level effect in the printout #PRINT is simulated by multiple tiny dots, and the uniformity of the dot distribution determines image quality of the printout #PRINT. Therefore, it is important to design a good halftone mask #MASK that uniformly distributes the tiny dots.

BRIEF SUMMARY OF THE INVENTION

A detailed description is given in the following embodiments with reference to the accompanying drawings.

An exemplary embodiment of a printing method is provided for printing an input image. Firstly, a halftone mask is generated. The input image is transformed into a halftone image comprising a plurality of halftone pixels through the halftone mask. The halftone image is then output for printing. The halftone mask is an array comprising N elements, and generation of the halftone mask comprises the following steps. An initial array comprising N elements is provided. Thereafter, a first value is selectively assigned to an element in the initial array to generate a first array. The second to $N^{th}$ arrays are then recursively generated based on the first array in the following steps. A minimum energy element in an $I^{th}$ array is first determined. An $(I+1)^{th}$ value is then assigned to the minimum energy element to generate an $(I+1)^{th}$ array, wherein I denotes 2 to N−1.

Another embodiment is a halftone mask generation method. An initial array comprising N elements is provided. A first value is selectively assigned to an element in the initial array, to generate a first array. Based on the first array, second to $N^{th}$ arrays are recursively generated by the following steps. First, an averaging process is performed on the $I^{th}$ array to generate an $I^{th}$ energy array representing energy values of all elements in the $I^{th}$ array. The $I^{th}$ energy array is then transformed into a degraded array using the DWT algorithm, wherein the degraded array is composed of a plurality of DWT coefficients. A minimum energy element of the $I^{th}$ array is determined based on a minimum DWT coefficient of the degraded array. An $(I+1)^{th}$ value is then assigned to the minimum energy element to generate an $(I+1)^{th}$ array.

An alternative embodiment of a halftone image transformation method is provided. A halftone mask is first generated by the following steps: first, an initial array comprising N elements is defined; second, a first value is selectively assigned to an element in the initial array to generate a first array; and lastly, second to $N^{th}$ arrays are recursively generated based on the first array.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
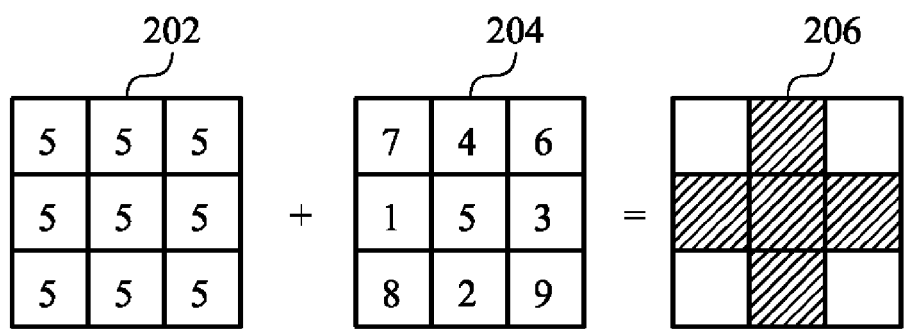
FIG. 2 is a flowchart of image transformation.

FIG. 2 is a flowchart of image transformation. A halftone mask 204 is generated as a dither template to perform the image transformation, such that an original pixel 202 is transformed to a halftone pixel 206 through the halftone mask 204.

The original pixel 202 may represent one or more pixel within an original image, in which the values denote gray levels, such as 5. The halftone mask 204 may be a 3 by 3 array, comprising values 1 to 9 randomly distributed therein. The halftone mask 204, in the embodiment, is progressively, sequentially and iteratively generated from N arrays of N levels, each according to a previous array of a previous level, which will be further described below. When the halftone transformation begins, the original pixel 202 is compared with the halftone mask 204 to generate a halftone pixel 206, comprising a 3 by 3 array comprising 9 dots. The original pixel 202 is overlapped by the halftone mask 204, and elements in the halftone mask 204 are compared with the original pixel 202. If the original pixel 202 has a value greater than that of an element in the halftone mask 204, a corresponding dot in the halftone pixel 206 is assigned to a first value to represent a color, i.e. black. Conversely, if the value of original pixel 202 is less than an element in the halftone mask 204, a corresponding dot in the halftone pixel 206 is assigned to a second value to represent another color, i.e. white. In this way, the original pixel 202 of different gray levels can be converted to different number of black dots through the halftone mask 204, and distribution of the black dots are determined by the arrangement of elements within the halftone mask 204.

In practice, a halftone mask 204 may not only be a 3 by 3 array, but an 8 by 8 or 32 by 32 array. The distribution of elements in the halftone mask 204 must be fully randomized to exhibit visual uniformity, however, currently there isn't an efficient algorithm to randomize the distribution of elements in the halftone mask 204. Thus, in the invention a method for generating the halftone mask is proposed to solve the issue.

Discrete Wavelet Transformation (DWT) is an algorithm for statistic analysis, usually adapted in various domains such as signal processing, compression, noise reduction, digital watermark and edge detection. DWT can supply information for spatial domain, frequency domain and image rescaling. In addition to the spatial and frequency domain information, the invention adapts the image rescaling information (from lowest to highest) to generate the halftone mask. Basically, a DWT operation comprises two filtration stages. The first stage comprises a high-pass filtration and a low-pass filtration, whereby an input is converted into a high-frequency result and a low-frequency result. The second stage also comprises a high-pass filtration and a low-pass filtration, thus, the two results from the first stage are further converted to yield a total of four results: high-high, high-low, low-high and low-low filtration results.

Figure 3A:
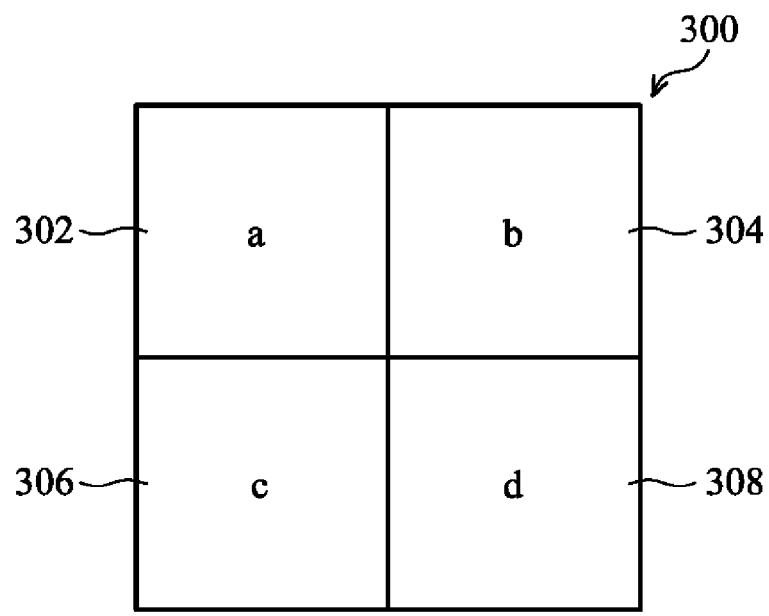
FIG. 3a shows a schematic diagram of an input image 300.
Figure 3B:
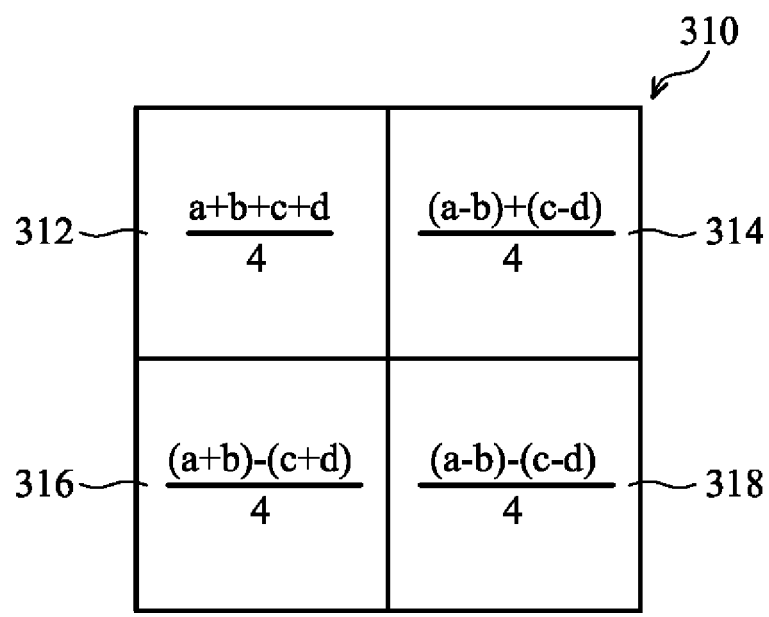
FIG. 3b shows an embodiment of a transformation result 310.

FIGS. 3a and 3b are provided to illustrate the characteristics of DWT. FIG. 3a shows an input image 300 equivalently divided into four areas: a first area 302, second area 304, third area 306 and fourth area 308. Element value sums within each area are represented as a, b, c and d.

FIG. 3b shows a transformation result 310 obtained by performing a DWT operation on the input image 300, comprising a low-low frequency filtration result 312, a low-high frequency filtration result 314, a high-low frequency filtration result 316 and a high-high frequency filtration result 318. It should be appreciated that there may be other method to provide the multi-resolution analysis in spatial and frequency domains. It can be seem that the four results have just halved widths and lengths with respect to those of the input image 300. The element value sum within the low-low frequency filtration result 312 is (a+b+c+d)/4. Meanwhile, in the low-high frequency filtration result 314 it is [(a−b)+(c−d)]/4, the high-low frequency filtration result 316 it is [(a+b)−(c+d)]/4, and the high-high frequency filtration result 318 it is [(a−b)−(c−d)]/4. The low-low frequency filtration result 312 is actually a quarter sized image of the original image. If the original image is a uniform plane where the value sums a, b, c and d are all identical, the element value sum of low-low frequency filtration result 312 would be exactly a, and the element value sums of the low-high frequency filtration result 314, high-low frequency filtration result 316 and high-high frequency filtration result 318 would be 0. An inherent conclusion can be made, that as the element value sums of the low-high frequency filtration result 314, high-low frequency filtration result 316 and high-high frequency filtration result 318 approximate 0, the input image 300 has better uniformity because the high frequency energy is relatively low. According to the invention, a halftone mask can be designed based on this concept, having values distributed in maximum uniformity. For example, energy distribution of an image can be observed by recursively performing a DWT operation on the low-low frequency arrays obtained from the image, thereby a minimum energy element can be found as a basis to incrementally establish a halftone mask from an empty mask. The low-high, high-high and high-low frequency arrays may also be observed to establish a halftone mask, however, the computation resource consumption may be more considerable.

Figure 1:
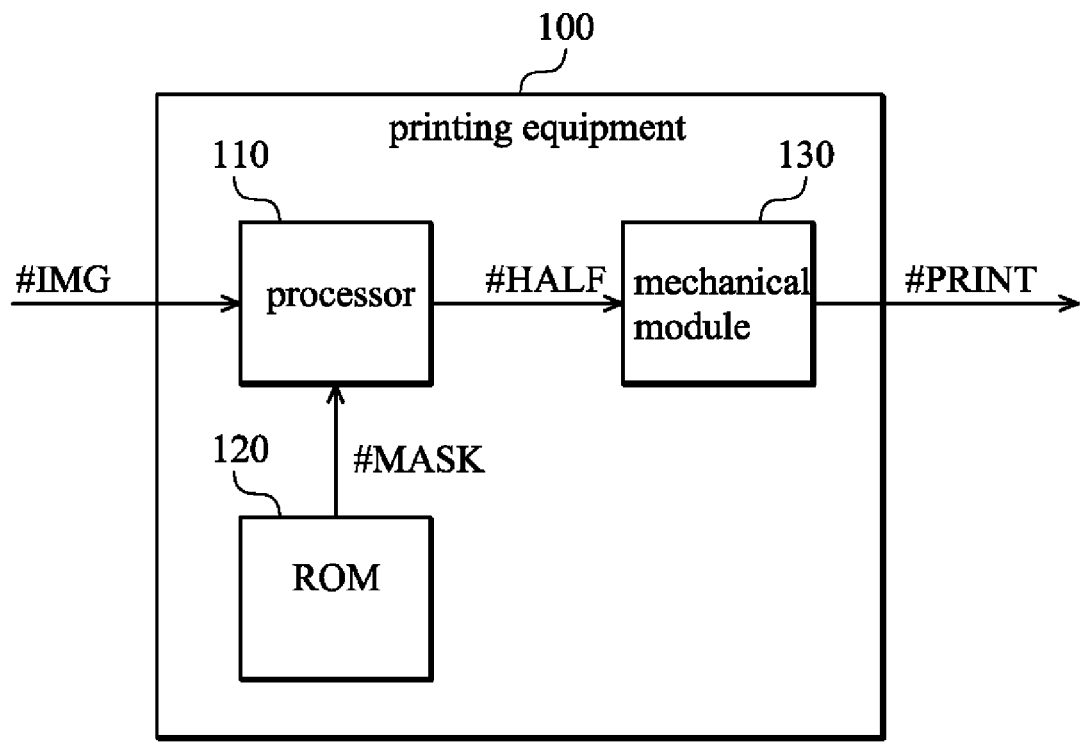
FIG. 1 shows a conventional printing equipment 100.
Figure 4:
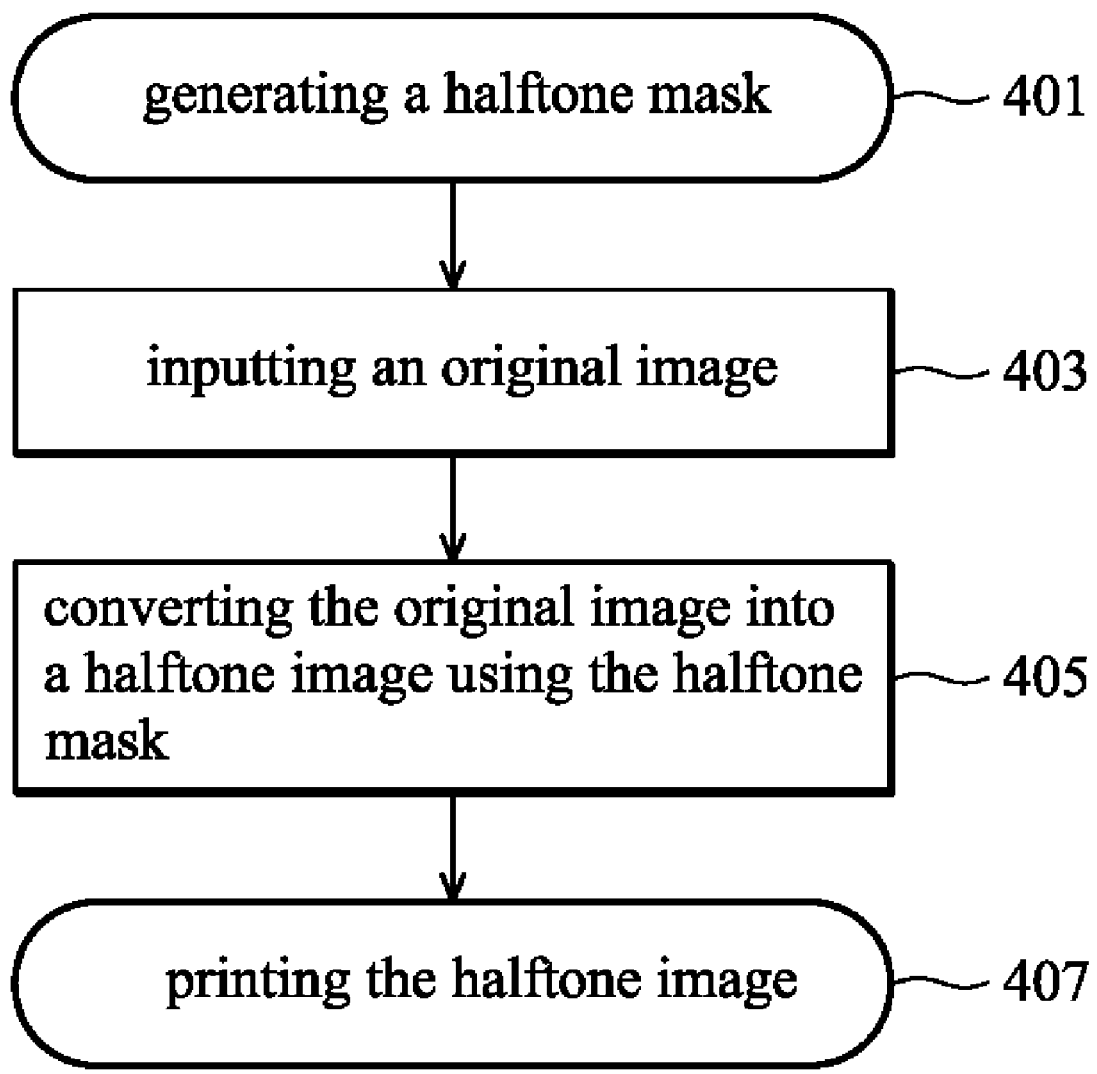
FIG. 4 is a flowchart of a printing method according to the invention.

FIG. 4 is a flowchart of an embodiment of a printing method. The DWT concept can be summarized into the following steps, to be implemented on the printing equipment 100 as shown in FIG. 1. In step 401, a halftone mask #MASK is generated using the DWT algorithm, stored in the ROM 120 of FIG. 1. In step 403, an original image #IMG is sent to the processor 110. In step 405, the processor 110 transforms the original image #IMG into a halftone image #HALF using the halftone mask #MASK. The transformation can be performed by overlapping and comparison as introduced in FIG. 2, whereby the original image #IMG is converted pixel by pixel into halftone dots. In step 407, the mechanical module 130 receives the halftone image #HALF, and drives a physical ink control mechanism to accordingly render a printout #PRINT.

The step 401 of FIG. 4 actually comprises the following recursive steps. The halftone mask is designated to be a square array comprising N elements. Initially an initial array M(0) is provided, and then a first array M(1), second array M(2) and eventually the $N^{th}$ array M(N) are sequentially generated. All elements in the initial array M(0) are set to a particular value, such as 0, and the first array M(1) has only one nonzero element while other elements are zero. The nonzero element has a value 1. The second array M(2) is established on the basis of the first array M(1), whereby one of the zero value elements is selected and set to a value 2. Successive element values are incrementally selected and set to a value corresponding to each stage, and eventually an $N^{th}$ array is generated, comprising element values 1 to N distributed therein. Since uniformity is an issue, the DWT algorithm is used to determine locations where the element values per stage should be added.

In the embodiment, a multi-resolution analysis is performed to analyze characteristics of the arrays M(0) to M(N) in spatial and frequency domains. The characteristics are energy distributions of the elements in the arrays, and the analysis uses the DWT algorithm whereby information of spatial and frequency domains can be extracted. The steps are summarized as follows. In step 501, the halftone mask generation process is initialized with an initial array M(0), in which element values are all set to a default value. In step 503, one element within the initial array is selected by random, and assigned a value 1. The first array M(1) is thereby generated. Thereafter, a recursive loop starting with I=1 is initialized. In step 505, a multi-resolution analysis operation is performed on the I$^{th}$ array M(I) to determine energy distributions within the array, such that a minimum energy element within the I$^{th}$ array M(I) can be located. Generally, the energy represents the density of valued elements within the array. For example, if a plurality of valued elements are distributed within a certain area, the energy of the area is assessed to be high. Conversely, if a particular area comprises less valued elements, the energy of the particular area would be low. The minimum energy element represents a location where the density of valued elements within an array is lowest. The process of searching the minimum energy element is recursive and will be converged, and detailed embodiment is described later. In step 507, the minimum energy element is assigned with a value I+1, thereby the (I+1)$^{th}$ array M(I+1) is generated, and M(I+1) is a basis array for generating M(I+2). In step 509, the variable I is incremented by 1 and examined whether it reaches a value N. If the incremented variable 1 equals value N, step 511 is processed, the N$^{th}$ array M(N) is output as a halftone mask. Otherwise, if the incremented I is not equal to value N−1, the process loops back to step 505, but not limited to.

Figure 5:
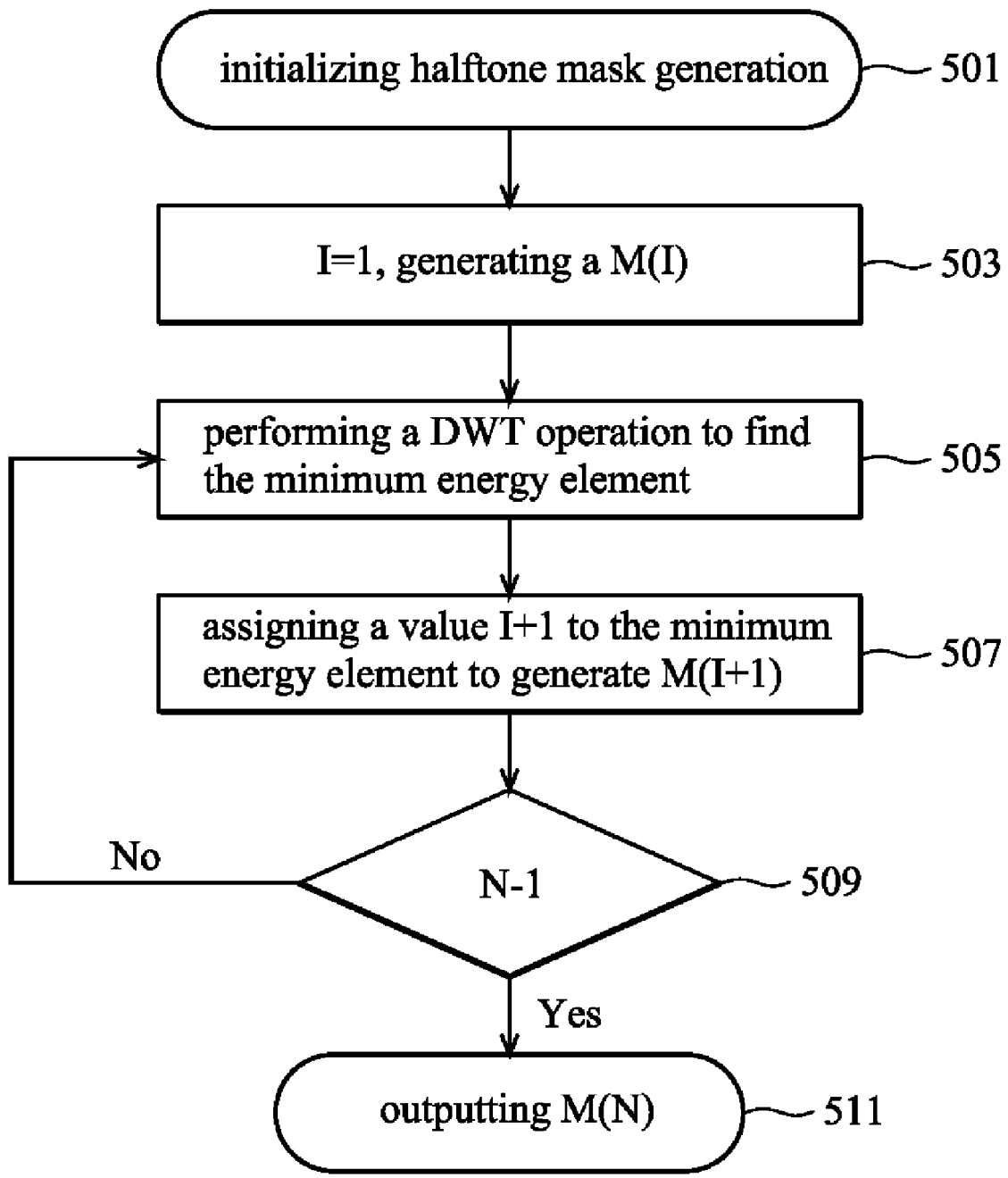
FIG. 5 is a flowchart of halftone mask generation according to an embodiment of the invention.

According to the embodiment of FIG. 5, since each element value is always assigned to a minimum energy element per stage, it can be assured that the distribution of elements of the halftone mask achieves perfect uniformity. The N$^{th}$ array M(N) output from step 511 can be directly assessed as the halftone mask. Alternatively, the N$^{th}$ array M(N) may further be truncated or rescaled before being output as a halftone mask. For example, if N is 1024, the N$^{th}$ array M(N) contains 1024 gray levels. The N$^{th}$ array M(N) can be divided by 16 using an integer division, making values 1 to 16 truncated to value 1, values 17 to 32 truncated to value 2, and analogously, values 1009 to 1024 truncated to value 64. Hence, a halftone mask of 64 gray levels is thereby generated, wherein each gray level is associated to 16 elements.

Figure 6:
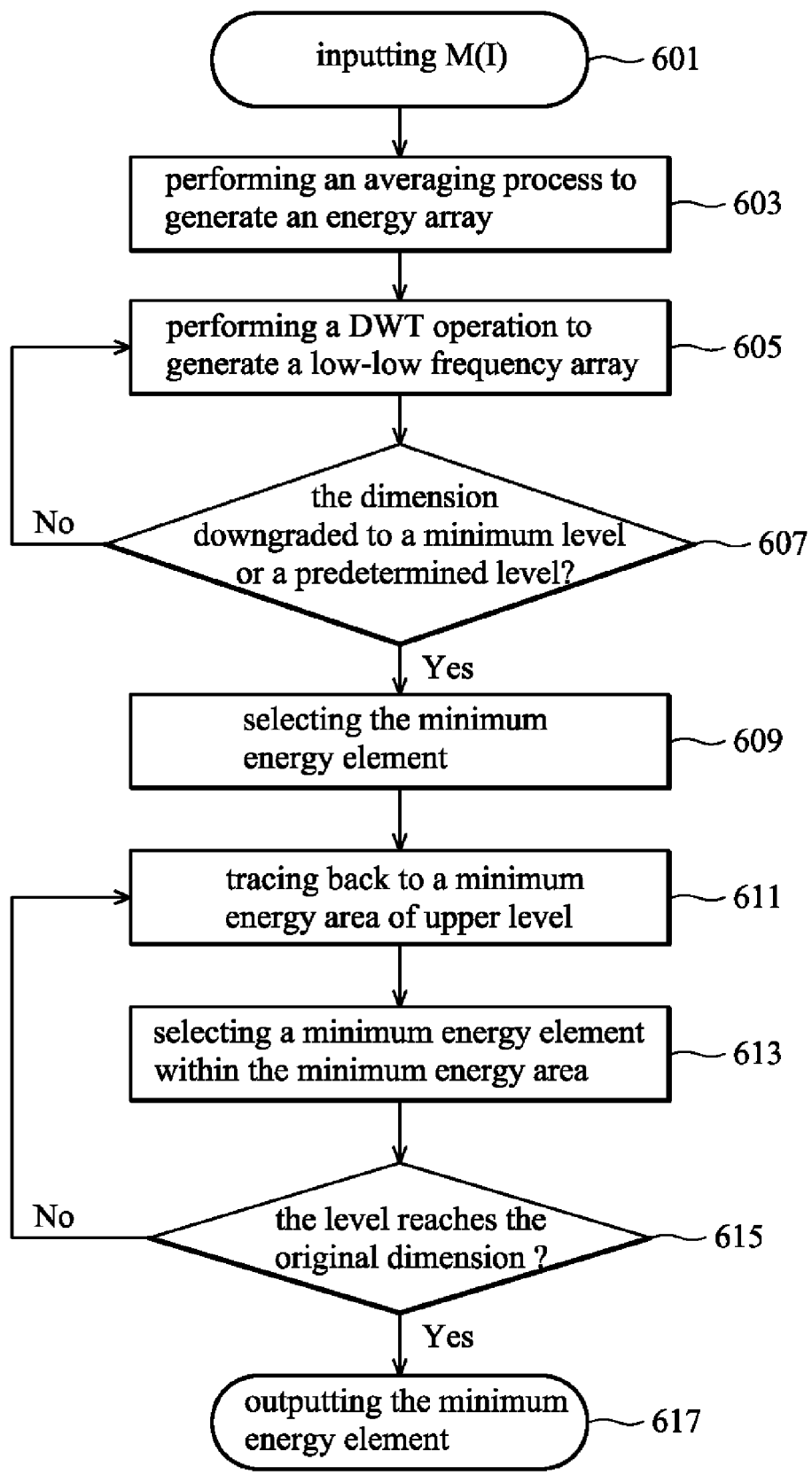
FIG. 6 is a flowchart of minimum energy element determination according to an embodiment of the invention.

FIG. 6 is a flowchart of minimum energy element determination. The multi-resolution analysis decomposes the array into a plurality of sub-arrays of lower dimensions, and such that the uniformity of energy distribution can be observed as a basis to locate an optimal minimum energy element. The decomposition may be recursively performed until a lowest possible dimension sub-array is obtained. Step 505 of FIG. 5 is specifically described herein. In step 601, the minimum energy element determination is initialized, and the I$^{th}$ array M(I) is analyzed. In step 603, an averaging process is performed on the I$^{th}$ array to generate an energy array indicating estimated energy of each element within the I$^{th}$ array. The elements in the I$^{th}$ array M(I) can be categorized into two types, zero and nonzero. The nonzero elements are given equivalent weighting factors (such as 9). The averaging process uniformly modifies weighting factors of elements around the nonzero elements, allowing the energy array to properly represent density of valued element distribution. In step 605, by using the DWT algorithm, the energy array is further converted into a first low-low frequency array, a first low-high frequency array, a first high-low frequency array and a first high-high frequency array. In the embodiment, only the first low-low frequency array is used. The first low-low frequency array is again converted by the DWT algorithm into a second low-low frequency array of halved dimension, and the same steps are repeated until the dimension is reduced to a minimal level or a predetermined level in step 607. For example, step 605 may be recursively processed until the M$^{th}$ low-low frequency array has a dimension of 2 by 2, 3 by 3 or 4 by 4. In step 609, the location of the minimum energy element in the M$^{th}$ low-low frequency array is determined. If the M$^{th}$ low-low frequency array is a 2 by 2 array, the elements are like the four areas of the input image 300 in FIG. 3, wherein observation of the minimum one is easy. As the minimum energy element is determined, a trace back process is recursively performed in steps 611 to 615. In step 611, based on the minimum energy element in the k$^{th}$ low-low frequency array, a corresponding minimum energy area in the (k−1)$^{th}$ low-low frequency array can be allocated. In step 613, likewise, based on a minimum energy element within the minimum energy area of the (k−1)$^{th}$ low-low frequency array, a minimum energy area in the (K−2)$^{th}$ low-low frequency array is allocated. If more than one element within a minimum energy area that have the minimum energy, one of them can be selected by random, or alternatively, a further Gaussian blurring operation can be performed to help determine the minimum one. In step 615, if k is still greater than 2, the recursive trace back continues to proceed. Eventually, the minimum energy area of the first low-low frequency array is acquired, and thereafter, a minimum energy element can be selected therefrom, from which a minimum energy area of the energy array can be induced. The dimension of the energy array is identical to that of the I$^{th}$ array M(I), so the location of the minimum energy element within the energy array is the same as that of the I'h array M(I). In step 617, a value (I+1) is assigned to the minimum energy element, thereby acquiring the (I+1)$^{th}$ array M(I+1).

Figure 7A:
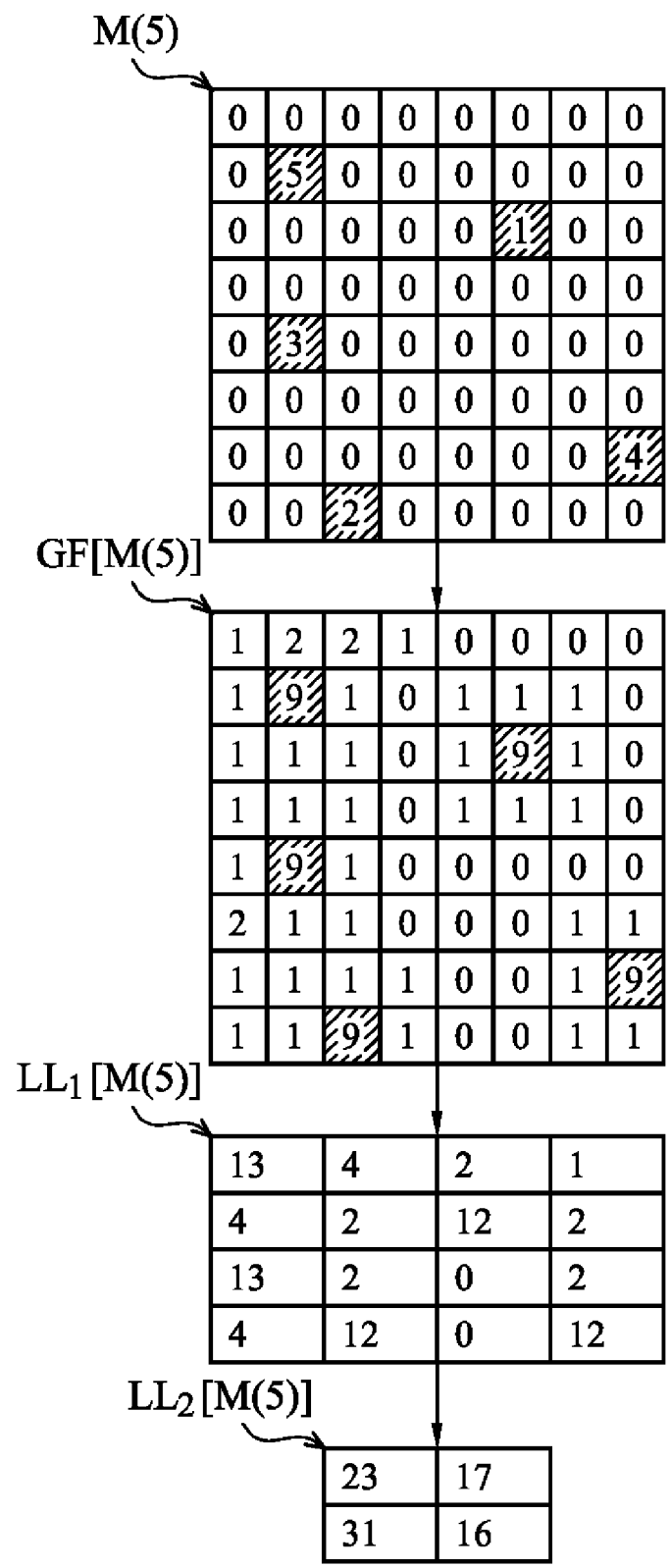
FIG. 7a shows an embodiment of recursive array degradation.

FIG. 7a shows an embodiment illustrating a recursive degradation process according to FIG. 6. Assume the 5$^{th}$ array M(5) is an 8 by 8 array, comprising values 1 to 5 uniformly distributed therein. A minimum energy element is to be found so as to assign a 6$^{th}$ value to generate a 6$^{th}$ array M(6), with the uniformity of value distributions kept in balance. Firstly, all elements in the 5$^{th}$ array M(5) are given weighting factors of value 9. An energy array GF[M(5)] is then generated using the averaging process as described in step 603. The averaging process can be a Gaussian blurring algorithm, which is described in FIG. 7c. Thereafter, steps 605 and 607 are processed, in which a first low-low frequency array LL1[M(5)] is generated from the energy array GF[M(5)], and a second low-low frequency array LL2[M(5)] is generated from the first low-low frequency array LL1[M(5)]. The recursive DWT operation stops in step 607 because the second low-low frequency array LL2[M(5)] is already down to the lowest dimension, 2 by 2. In step 609, a minimum energy area is determined in the second low-low frequency array LL2[M(5)]. In the embodiment, the second low-low frequency array LL2[M(5)] comprises elements of values 23, 17, 31 and 16, among which the element of value 16 is the lowest. The values represent energy level, so the corresponding area in the first low-low frequency array LL1[M(5)] is selected to be the minimum energy area.

Figure 7B:
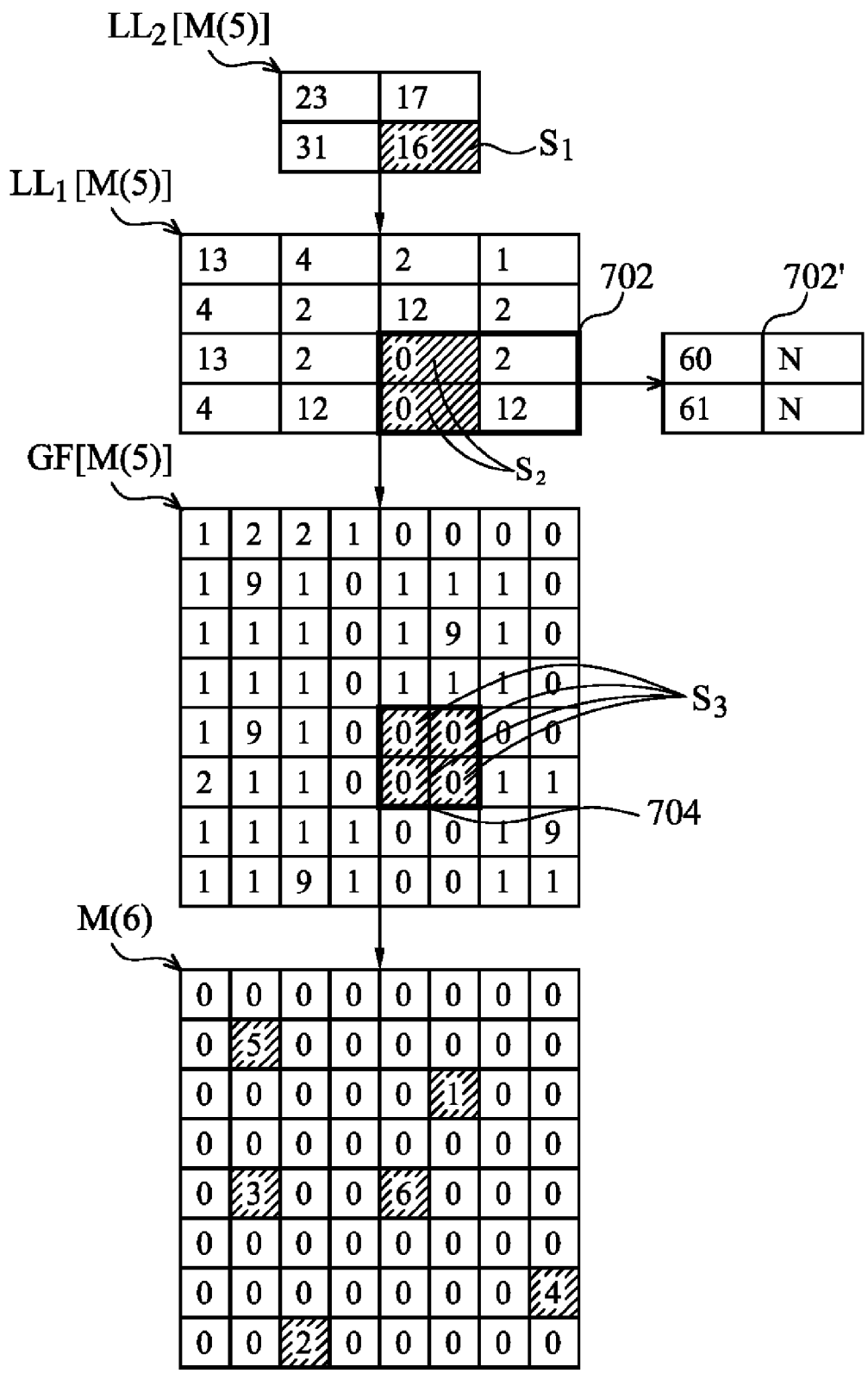
FIG. 7b shows an embodiment of the recursive trace back step.

FIG. 7b is a flowchart of trace back. The minimum energy area in the second low-low frequency array LL2[M(5)] is denoted as S1. In step 611, a minimum energy area 702 of the first low-low frequency array LL1[M(5)] based on the S1 in the second low-low frequency array LL2[M(5)] is located. In step 613, a minimum energy element in the minimum energy area 702 is determined. In the embodiment, there are two elements having the minimum energy 0, however, only one can be used. A further averaging process can be performed on the first low-low frequency array LL1[M(5)] to help distinct the energy differences in the minimum energy area 702. The averaging process can be a Gaussian blurring algorithm, and the invention is not limited to it. Character 702' is an averaged result of minimum energy area 702, wherein the element of value 60 is deemed to be the lowest one. Thus, the element corresponding to value 60 is selected to be the minimum energy element. Alternatively, a more straightforward approach is to select one of the candidate elements by random. In the embodiment, the upper one is chosen, which is associated to the minimum energy area 704 in the energy array GF[M(5)]. The minimum energy area 704 has four zero values, wherein one must be chosen as the minimum energy element. Likewise, the selection is made by random or by a further averaging process. The chosen element is assigned with a value 6, thus a $6^{th}$ array M(6) is generated, comprising values 1 to 6, which are uniformly distributed.

Figure 7C:
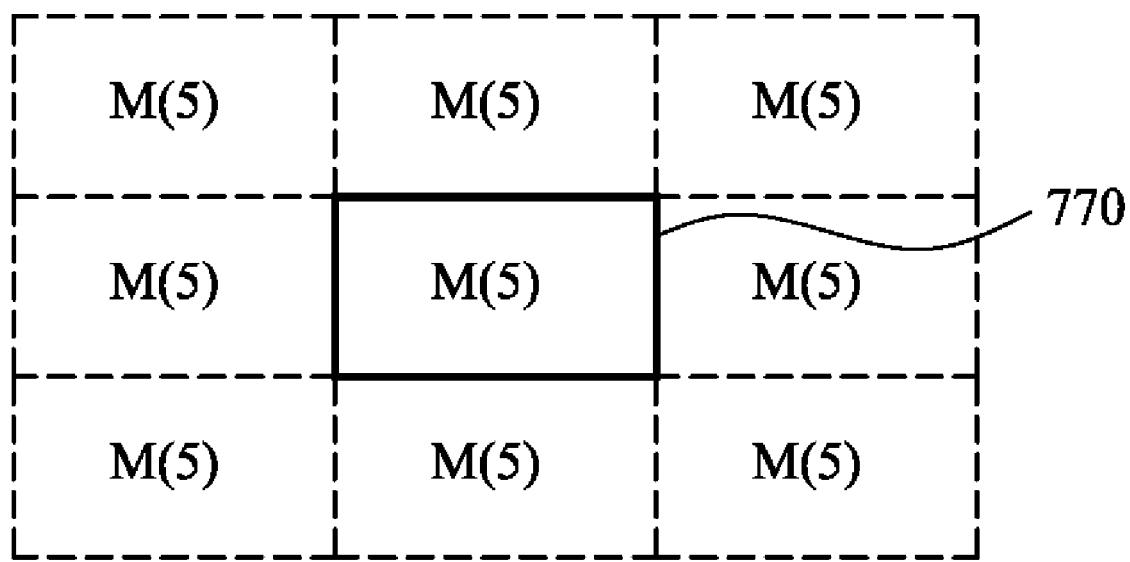
FIG. 7c shows an embodiment of an energy array.

FIG. 7c shows an embodiment of energy array generation. Firstly, the $5^{th}$ array M(5) is replicated to generate nine identical ones, arranged in a 3 by 3 square, wherein the area 770 indicates the center one. Then a Gaussian blurring operation is performed on the nine arrays, and the blurring result within the 770 is assessed as the energy array GF[M(5)].

Figure 8A:
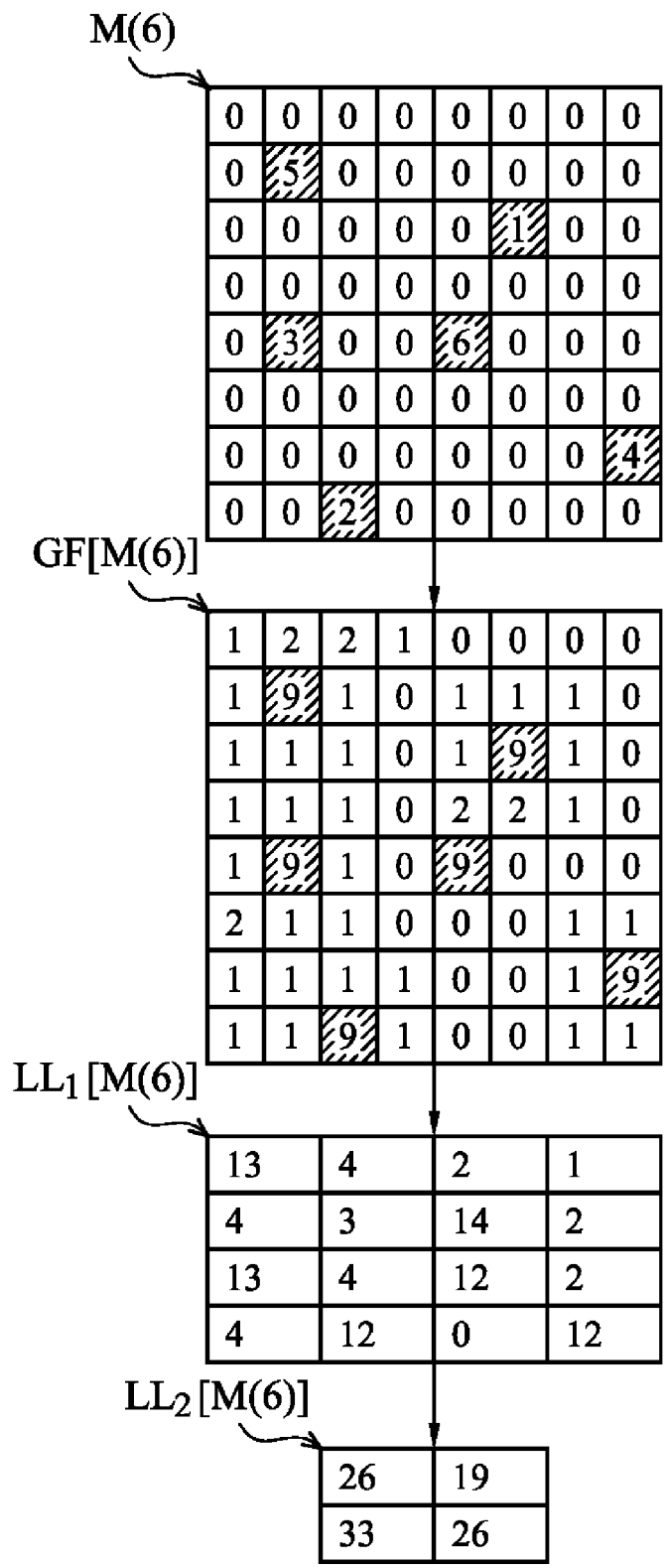
FIG. 8a shows another embodiment of recursive array degradation.
Figure 8B:
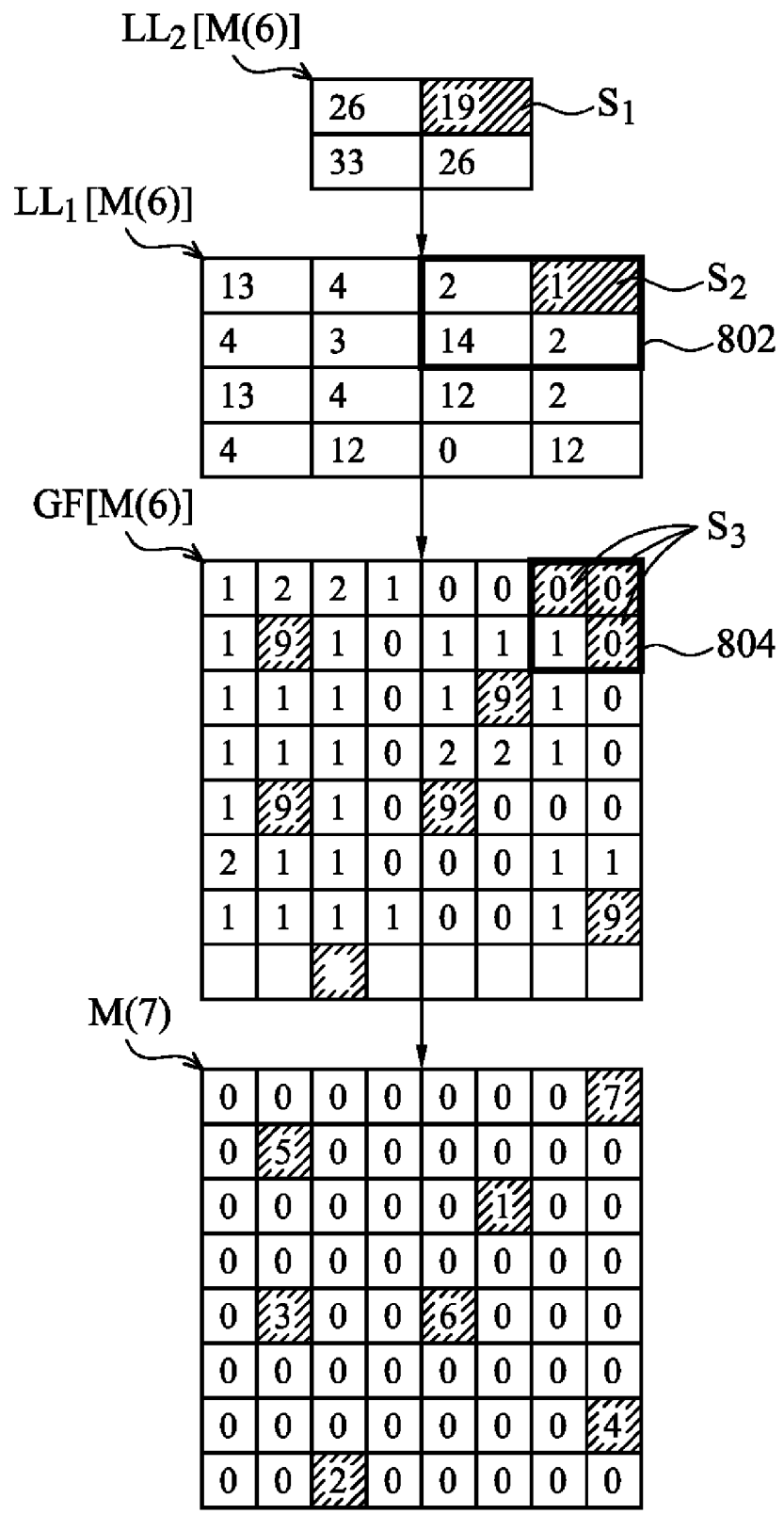
FIG. 8b shows another embodiment of the recursive trace back step.

For better understanding, a further embodiment is provided in FIGS. 8a and 8b to illustrate how a $7^{th}$ array M(7) is generated from the $6^{th}$ array M(6). Firstly, all elements in the $6^{th}$ array M(6) are given weighting factors of value 9. An energy array GF[M(6)] is then generated using the averaging process as described in step 603. Thereafter, steps 605 and 607 are processed, in which a first low-low frequency array LL1[M(6)] is generated from the energy array GF[M(6)], and a second low-low frequency array LL2[M(6)] is generated from the first low-low frequency array LL1[M(6)]. The recursive DWT stops in step 607 because the second low-low frequency array LL2[M(6)] has the lowest dimension, 2 by 2. In step 609, a minimum energy area is determined in the second low-low frequency array LL2[M(6)]. In the second low-low frequency array LL2[M(6)], the element of value 16 is the lowest one.

FIG. 8b shows an embodiment of trace back corresponding to FIG. 8a. The minimum energy area in the second low-low frequency array LL2[M(6)] is denoted as S1. In step 611, a minimum energy area 802 of the LL1[M(6)] based on the S1 in the LL2[M(6)] is located. In step 613, a minimum energy element in the minimum energy area 802 is determined. In the embodiment, only one element has the minimum energy 1. Thus, the element of value 1 is selected to be the minimum energy element, which is associated to a minimum energy area 804 in the energy array GF[M(6)]. The minimum energy area 804 has three zero values, among which one must be chosen as the minimum energy element. Likewise, the selection is made by random or by a further averaging process. Finally, the chosen element is assigned with a value 7, thus a $7^{th}$ array M(7) is generated, comprising values 1 to 7, which are uniformly distributed.

The described embodiments are recursively processed, whereby an $8^{th}$ array M(8) is generated from the $7^{th}$ array M(7), and so on. Eventually a $64^{th}$ array M(64) is generated. The $64^{th}$ array M(64) can be directly used as a 64 gray level halftone mask, and alternatively can be truncated to represent a lower gray level halftone mask. For example, all element values in the $64^{th}$ array M(64) may be divided by 8 using integer division, thereby values 1 to 8 are truncated to 1, values 9 to 16 are truncated to 2, and analogously, values 57 to 64 are truncated to 8. In this way, the truncated array becomes an 8 gray level halftone mask, with each gray level associated to 8 elements. When performing DWT, it is not necessary to degrade to the lowest dimension 2 by 2 before a minimum energy element can be determined. The degradation can be stopped when a 4 by 4 degraded array is obtained, and the minimum energy element would be selected therefrom with the help of Gaussian blurring algorithm or by random.

The embodiment has provided an array dimension of 8 by 8, however, it is inherent that a modification can be made to implement other array dimensions. In addition to printing applications, various other applications can also be benefited from the invention, such as display panels.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A halftone mask generation method, for transforming an input image into a halftone image, comprising:
   (a) defining an initial array;
   (b) assigning a first value to a first element of the initial array for generating a first array;
   (c) transforming the first array into a first degraded array, wherein the first degraded array is composed of a plurality of first coefficients;
   (d) determining a second position of the first array based on a minimum of the first coefficients; and
   (e) assigning a second value to the second element of the initial array for generating a second array.

2. The method of claim 1, wherein step (b) further comprises: performing an averaging process on the first array.

3. The method of claim 2, wherein step (c) using a DWT algorithm to generate the first degraded array till the first degraded array achieve a predetermined dimension, and the first degraded array is a low-low frequency array.

4. The method of claim 2, wherein the initial array comprising N elements further comprising
   (a1) transforming and averaging a $I^{th}$ array into a $I^{th}$ degraded array, wherein the $I^{th}$ degraded array is composed of a plurality of $I^{th}$ coefficients;
   (a2) determining a $(I+1)^{th}$ position of the $I^{th}$ array based on a minimum of the $I^{th}$ coefficients; and
   (a3) assigning a $(I+1)^{th}$ value to the $(I+1)^{th}$ element of the initial array for generating a $(I+1)^{th}$ array;
   wherein the halftone mask is generated when recursively processing I from 3 to N−2.

5. The method of claim 4, wherein step (a1) using a DWT algorithm to generate the $I^{th}$ degraded array till the $I^{th}$ degraded array achieve a predetermined dimension, and the $I^{th}$ degraded array is a low-low frequency array.

6. A halftone image transformation method, transforming an input image into a halftone image, comprising:
   generating a halftone mask, comprising:
   defining an initial array comprising N elements;
   selectively assigning a first value to a first element of the initial array, to generate a first array; and
   sequentially assigning a second value at a second element of the initial array to a $N^{th}$ value at a $N^{th}$ element of the initial array for generating a second array to a $N^{th}$ array, wherein the $N^{th}$ array is assessed to be the halftone mask and assigning a $(I+1)^{th}$ value at a $(I+1)^{th}$ element of the initial array comprises:
   performing an averaging process on an $I^{th}$ array to generate an $I^{th}$ energy array representing energy values of all elements in the $I^{th}$ array; and
   calculating a minimum energy element in the $I^{th}$ array to determine the $I^{th}$ element;
   using the halftone mask to transform the input image into the halftone image comprising a plurality of halftone pixels.

7. The halftone image transformation method as claimed in claim 6, wherein the step of generating the $(I+1)^{th}$ array based on the minimum energy element of the $I^{th}$ array comprises:
   transforming the $I^{th}$ energy array into a first low-low frequency array using a DWT algorithm;
   recursively generating a $k^{th}$ low-low frequency array from a $(k-1)^{th}$ low-low frequency array using the DWT algorithm; and
   determining the minimum energy element on the $I^{th}$ array based on the $k^{th}$ low-low frequency array and the $I^{th}$ energy array.

8. The halftone image transformation method as claimed in claim 7, wherein the step of generating the $(I+1)^{th}$ array based on the minimum energy element of the $I^{th}$ array further comprises:
   recursively performing a trace back to determine a minimum energy area of the $(k-1)^{th}$ degraded array based on the minimum energy element of the $k^{th}$ degraded array, so as to determine the minimum energy element of the first low-low frequency array;
   determining a minimum energy area on the $I^{th}$ energy array based on the minimum energy element of the first low-low frequency array; and
   selecting one element among the minimum energy area of the $I^{th}$ energy array to be the minimum energy element of the $I^{th}$ energy array.

9. The halftone image transformation method as claimed in claim 8, wherein the step of trace back comprises, if more than one element of the $k^{th}$ low-low frequency array have minimum energy, performing an additional averaging process on the $k^{th}$ low-low frequency array to facilitate the determination of the minimum energy element of the $k^{th}$ degrade array.

10. The halftone image transformation method as claimed in claim 8, wherein the step of trace back comprises, if more than one element of the $k^{th}$ low-low frequency array have minimum energy, randomly selecting one element thereof as the minimum energy element.

11. The halftone image transformation method as claimed in claim 8, wherein the step of transforming the input image using the halftone mask comprises:
   scanning the input image by the halftone mask, wherein each pixel of the input image is compared with the halftone mask to generate a plurality of halftone pixels respectively, and wherein:
   elements in the halftone mask having values greater than a pixel value generates halftone pixels of a first value respectively; and
   elements in the halftone mask having values less than the pixel value generates halftone pixels of a second value respectively.

12. The halftone image transformation method as claimed in claim 7, wherein the averaging process is a Gaussian blurring algorithm.

13. A method for generating a halftone mask to be a dither template, comprising:
   a) defining a basis array having N elements;
   b) processing a multi-resolution analysis on the basis array to a predetermined level, to determine a minimum energy element in the basis array;
   c) assigning a first value to locate in the minimum energy element of the basis array to generate a first assigned array; and
   d) replacing the first assigned array as the basis array in step (a), and repeating step (a) to step (c) for generating a second assigned array.

14. The method as claimed in claim 13, wherein the multi-resolution analysis is a process for analyzing characteristics of the basis array in spatial and frequency domains.

15. The method as claimed in claim 13, wherein step (d) further comprises:
   replacing the $(I-1)^{th}$ assigned array as the basis array in step (a), and repeating step (a) to step (c) for generating a $I^{th}$ assigned array, wherein the $I^{th}$ assigned array is the halftone mask.

16. The method as claimed in claim 13, wherein the multi-resolution analysis comprises:
   recursively decomposing the basis array to the predetermined level using the DWT algorithm to obtain a plurality of sub-arrays, wherein the minimum energy element of the basis array is determined in accordance with one of the sub-arrays.

17. The method as claimed in claim 16, wherein decomposition of the basis array comprises: applying a Gaussian blurring algorithm to average the basis array.

* * * * *